United States Patent [19]

Kagawa et al.

[11] Patent Number: 5,221,715
[45] Date of Patent: Jun. 22, 1993

[54] POLY(1-BUTENE)RESIN COMPOSITION

[75] Inventors: Fukashi Kagawa; Haruhiko Tanaka, both of Yamaguchi, Japan

[73] Assignee: Shell Oil Company, Houston, Tex.

[21] Appl. No.: 758,049

[22] Filed: Sep. 12, 1991

[30] Foreign Application Priority Data

Sep. 21, 1990 [JP] Japan .................................. 2-253568

[51] Int. Cl.$^5$ ............................................. C08L 23/20
[52] U.S. Cl. ................................ 525/240; 525/191; 524/528
[58] Field of Search ............... 525/240, 191; 524/528

[56] References Cited

U.S. PATENT DOCUMENTS 3,894,120  7/1975  Frese et al. ...................... 525/240
4,113,804  9/1978  Cotten et al. ...................... 260/897
4,677,025  6/1987  Davison et al. .................... 525/192

OTHER PUBLICATIONS

Journal of Poly. Sci–vol 38 No. 8–Aug. 1985–3163–3165 Hong et al.

*Primary Examiner*—Carman J. Seccuro, Jr.
*Attorney, Agent, or Firm*—James O. Okorafor

[57] ABSTRACT

The composition of this invention is a poly(1-butene) resin composition which has characteristics such as excellent rigidity, creep characteristic and impact resistance, which a poly(1-butene) resin inherently possess, and is excellent in moldability, particularly moldability in high molding speed, so-called high speed moldability. This composition is particularly useful in the manufacture of hot water pipes.

16 Claims, No Drawings

POLY(1-BUTENE)RESIN COMPOSITION

FIELD OF THE INVENTION

This invention generally relates to a poly(1-butene) resin composition. More particularly this invention relates to a poly(1-butene) resin composition which has an excellent impact resistance, creep resistance, and high speed moldability.

BACKGROUND OF THE INVENTION

Heretofore, piping materials made of a metal such as lead-plated steel pipes, copper pipes and lead pipes have been used as a piping material for cold and hot water supply. However, there are problems, for example, when steel pipes are used the water color changes to red or black due to rust. In the case of copper pipes pinholes and blue piping, materials free from such problems are sought. Thus, piping materials are been used of which the materials comprise of a synthetic resin such as poly(-vinyl chloride), polyethylene or poly(1-butene). These piping materials are not usually affected by the formation of rust or pinholes due to electrolytic corrosion.

Among these piping materials made of a synthetic resin, piping materials comprising a poly(1-butene) resin are excellent in pressure tight strength, high temperature creep resistance, heat resistance, and flexibility. Therefore, poly(1-butene) resins are one of the most suitable materials useful as a piping material for cold and hot water supply. Thus, it is expected that the demand for pipes comprising this poly(1-butene) resin will increase.

Although available poly(1-butene) resins are excellent in rididity, creep resistance, impact resistance, crystallization speed and the like, they have a narrow molecular weight distribution such that the ratio ($\overline{M}w/\overline{M}n$) of weight average molecular weight ($\overline{M}w$) to number average molecular weight ($\overline{M}n$) is 6 or less. Therefore, when such a resin is molded into a pipe having an aperture of 30 mm or less, it can sufficiently be molded at a low molding speed (3 m/min or less), but when it is molded into a pipe at a higher molding speed, rough surfaces arise on the inner or outer surfaces of the resulting pipe. These rough surfaces give the pipe a poor appearance. Therefore, a problem exists in molding poly(1-butene) resin at high molding speeds.

SUMMARY OF THE INVENTION

It is an object of this invention to provide a poly(1-butene) resin composition having characteristics such as excellent rigidity, creep resistance, and impact resistance, and moldability.

It is particular object of this invention to provide a poly(1-butene) resin having moldability at high molding speed, so-called high speed moldability.

Accordingly, it is now provided a poly(1-butene) resin composition comprising 60 to 95 weight parts of a poly(1-butene) resin (A) having a melt flow rate of from about 0.01 to 5 g/10 min, the ratio ($\overline{M}w/\overline{M}n$) of weight average molecular weight ($\overline{M}w$) to number average molecular weight ($\overline{M}n$), representing molecular weight distribution, of 6 or less and an isotactic value of 93% or more, and 40 to 5 weight parts of a poly(1-butene) resin (B) having 20 times or more the melt flow rate of poly(1-butene) resin (A), the ratio ($\overline{M}w/\overline{M}n$) of weight average molecular weight ($\overline{M}w$) to number average molecular weight ($\overline{M}m$), representing molecular weight distribution, of 6 or less and an isotactic value of 93% or more (hereinafter sometimes simply referred to as "composition").

Preferably, the composition of the invention further contains a nucleating agent.

DETAILED DESCRIPTION OF THE INVENTION

The composition of the invention is described in more detail below.

The poly(1-butene) resin (A) as a main component of the composition of the invention is a homopolymer of 1-butene, or a copolymer of 1-butene with an α-olefin having 2 to 20 carbon atoms.

The melt flow rate (MFR(E): ASTM D1238 E) of the poly(1-butene) resin (A) is 0.01 to 5 g/10 min, preferably 0.1 to 2 g/10 min, and this range gives good extrusion moldability of the resulting composition.

Further, in poly(1-butene) resin (A), the ratio ($\overline{M}w/\overline{M}n$) of weight average molecular weight ($\overline{M}w$) to number average molecular weight ($\overline{M}n$), representing molecular weight distribution, is 6 or less, and one having the ratio of 5 or less is preferred from the viewpoint that the resulting composition is excellent in impact resistance.

The ratio ($\overline{M}w/\overline{M}n$) of weight average molecular weight ($\overline{M}w$) number average molecular weight ($\overline{M}n$) can be measured by the following method.

(a) Using standard polystrene having a known molecular weight (monodisperse polystrene, produced by Toyo Soda Manufacturing Co., Ltd.), polystrenes having different molecular weight are subjected to GPC (gel permeation chromatography) analysis under the following measurement conditions:

Apparatus: Model 1 150 C, produced by Water Co.
Column: TSKGMH-6, 6 mmφ×600, produced by Toyo Soda Manufacturing Co., Ltd.
Sample amount: 400 μl
Temperature: 135° C.
Flow rate: 1 ml/min and a calibration curve is made between molecular weight M and EV (elution volume) value.

(b) Preparation of a Sample

A polymer sample whose molecular weight is to be measured and a solvent o-dichlorobenzene are placed in a flask to prepare a solution containing the solvent in an amount of 20 ml per 15 mg of the polymer.

2,6-di-t-butyl-cresol is added as a stabilizer to the polymer solution so that the concentration becomes 0.1% by weight.

The resulting solution is heated at 140° C. for 1 hour and then stirred for 1 hour to dissolve the polymer and the stabilizer completely.

Then, the solution is filtered at a temperature of from 135° to 140° C. using a filter of 0.5 μm.

The filtrate is subjected to GPC analysis under the same measurement conditions as (a) above. Number average molecular weight $$\overline{M}n = \Sigma MiNi/\Sigma Ni$$

and weight average molecular weight $$\overline{M}w = \Sigma Mi^2 Ni/\Sigma MiNi$$

are determined according to the previously disclosed calibration curve using the resulting EV value, and (Mw/Mn) is calculated.

The isotactic value of this poly(1-butene) resin (A) is 93% or more, and preferably is from 93 to 98%. At these values, the poly(1-butene) resin has an excellent rigidity, heat resistance and creep resistance.

This isotactic value (II) was measured according to the following method.

1-Butene resin was dissolved in 100 ml of n-decane, the solution was cooled to 0° C. and left at 0° C. for 24 hours to deposit the highly stereoregular component, and the weight % of the insoluble part was designated II.

The poly(1-butene) resin (B), another main component of the composition of this invention is, like the poly(1-butene) resin (A), a homopolymer of 1-butene, or a copolymer of 1-butene with another α-olefin having 2 to 20 carbon atoms, and when this other α-olefin having 2 to 20 carbon atoms is contained, it is present in the same amount as in poly(1-butene) resin (A).

In order to give good extrusion moldability of the resulting composition, the melt flow rate (MFR(E): ASTM D1238 E) of this poly(1-butene) resin (B) is at least 20 times, preferably 50 to 1000 times, greater than the melt flow rate of the poly(1-butene) resin (A).

Further, in poly(1-butene) resin (B), the ratio ($\overline{Mw}/\overline{Mn}$) of weight average molecular weight ($\overline{Mw}$) and number average molecular weight ($\overline{Mn}$) representing molecular weight distribution is 6 of less, and one having the ratio of 5 or less is preferred from the viewpoint that the impact resistance of the resulting composition is excellent.

The isotactic value (II) of poly(1-butene) resin (B) is 93% or more, and preferably is from 93 to 98%. At these values, (B) has an excellent rigidity, heat resistance, and creep resistance.

It has been observed that the high speed moldability of the inventive composition is substantially improved in comparison to other resins. This facilitates the molding of various articles, such as pipes. These molded articles have improved properties inclusive of good appearance and impact strength.

It is recommended that the inventive composition be used in a quantity containing poly(1-butene) resin (A)/poly(1-butene) resin (B) in amounts within the range of from about 60/40 to 95/5, preferably from about 90/10 to 70/30 by weight ratio.

It is preferred for the composition of the invention to further contain a nucleating agent. This addition of a nucleating agent is useful in that the solidification speed of the molten resin extruded from the die at the time of pipe molding becomes faster and more stabilized high speed moldability is obtained. Furthermore, the speed of crystal transition peculiar to poly(1-butene) resins is promoted even after the solidification and there is also an improved effect in the enhancement of the rigidity.

Examples of suitable nucleating agent include polyethylene resins, polyethylene waxes, ethylenebisstearoamide and polypropylene resins.

When the nucleating agent is added into the composition of the invention, the nucleating agent(s) is usually present in an amount within the range of from about 0.01 to 2 wt %, preferably from about 0.05 to 0.5 wt %.

The composition of the invention can be prepared by conventional methods that produce an intimate compound. One such method (1) comprises mixing the poly(1-butene) resin (A), the poly(1-butene) resin (B) and if necessary the nucleating agent using a Henschel mixer, V-blender, ribbon blender, tumbler blender or the like. Another such method (2) comprises, after the above mixing in (1), melting and kneading the mixture using a single-axial extruder, polyaxial extruder, banbury mixer, kneader or the like, and then granulating or pulverizing the kneaded composition. Furthermore, the present composition can also be prepared by obtaining the poly(1-butene) resins (A) and (B) respectively by polymerization and directly mixing the obtained polymerization solutions by stirring.

In order to enhance long-term properties such as heat aging resistance and chlorine water resistance of the molded articles obtained by molding the composition of the invention, the composition may contain antioxidant(s).

Example of the antioxidant(s) include phenolic and phosphorus series antioxidants such as 2,6-di-t-butyl-4-hydroxybenzoate, n-hexadecyl 3,5-di-t-butyl-4-hydroxybenzoate, 1,3,5-trimethyl-2,4,6-tris(3,5-di-t-butyl-4-hydroxybenzyl)benzene, 1,3,5-tris(t-butyl-3-hydroxy-2,6-dimethylphenyl) isocyanate, tris(3,5-di-t-butyl-4-hydroxyphenyl) isocyanate, n-octadecyl 3-(3,5-di-t-butyl-4-hydroxyphenyl)propionate, nickel salt of bis (3,5-d-t-butyl-4-hydroxybenzoylphosphonic acid) monoethyl ester, 2,2'-dihyroxy-3,3'-di(αmethylcyclohexyl)-5,5'-dimethyl-diphenylmethane, 4,4-thio-bis(3-methyl-6-t-buthylphenol), 1,1,3-tris(2-methyl-4-hydroxy-5-t-butylphenyl)butane,tetrakis[methylene-3-(3,5-di-t-butyl-4-hydroxyphenyl)propionate] methane, 2,6-di-t-butyl-p-cresol, 4,4'-methylene-bis(2,6-di-t-butyl-phenol), tris-(2,4-di-t-butyl-phenyl)phosphite and vitamin E. These are used alone or in a combination of two or more.

When the antioxidant is used it is usually present in an amount within the range of from about 0.1 to 2 weight parts, preferably from about 0.5 to 1.8 weight parts per 100 weight parts of the resin ((A)+(B)).

The composition of the invention may further contain, if necessary, an ultraviolet absorber, a fungicide, a rust inhibitor, a lubricant, a filler, a pigment, and a heat resistant stabilizer.

Furthermore, for the purpose of improving impact resistance, the composition of the invention may contain, for example, an olefinic elastomer such as an ethylene-propylene copolymer resin in a range of 15 weight % or less.

To facilitate molding and processing it is preferred that the composition of the invention usually have a melt flow rate in the range of from 0.2 to 5 g/10 min.

The following examples and tables further detail the various aspects of this invention.

EXAMPLES 1 TO 3

Antioxidants Irganox 1330, Irganox 1010 and Irganox 1076 were added, in the rates of 0.4 weight part, 0.3 weight part and 0.2 weight part respectively, to 100 weight part each of the compositions shown in Table 1 [1-butene homopolymer (A) (MFR: 0.2 g/10 min (ASTM: D1238 E), $\overline{Mw}/\overline{Mn}=4.5$, II=95%) and a 1-butene homopolymer (B) (MFR: 20 g/10 min (ASTM: D1238 E), Mw/Mn−4.5, II=95%)]. To each composition were added 0.2 weight part of polyethylene as a nucleating agent, 0.05 weight part of an isoindolinone yellow organic pigment as a pigment, and 0.2 weight part of titanium oxide. Each composition was stirred and mixed with a Henschel mixer, then melted and kneaded using a 65 mmφ extruder to prepare pellets of the poly(1-butene) resin composition.

The resulting pellets were subjected to a heating press at a temperature of 200° C. for 10 minutes to be melted, and pressurized for 5 minutes with a cooling press at about 30° C. to prepare two kinds of pressed sheets having thicknesses of 2 mm and 3 mm, respectively. These sheets were used as samples and measured for heat resistance, tensile yield stress and impact resistance strength.

Further, pipes having an inner diameter of 13 mm and an outer diameter of 17 mm were prepared with a pipe-molding apparatus (produced by Hitachi Zosen Sangyo Co., Ltd.) using the pellets of each of the poly(1-butene) resin compositions, and evaluated for the inside-hot pipe pressure-creep characteristic and for moldability. Results are shown in Table 1.

EXAMPLE 4

Pellets of a poly(1-butene) resin composition were prepared in the same manner as in Example 2 except for adding ethylene bisstearoamide (EBSA) as a nucleating agent. Pressed sheets were made of the pellets and measured for heat resistance, tensile yield stress and impact strength, and pipes were made of the pellet and evaluated for inside-hot pipe pressure-creep characteristics and for moldability. The results are shown in Table 1.

EXAMPLE 5

Pellets of a poly(1-butene) resin composition were prepared in the same manner as in Example 2 except no nucleating agent was added. Press sheets were made of the pellets and measured for heat resistance, tensile yield stress and impact strength, and pipes were made of the pellets and evaluated for inside-hot pipe pressure-creep characteristics and for moldability. The results are shown in Table 1.

EXAMPLES 6 AND 7

Pellets of a poly(1-butene) resin composition were prepared in the same manner as in Example 2 except that a 1-butene homopolymer (C) (MFR: 0.05/10 min, $\overline{Mw}/\overline{Mn}=5$, II=97%) and a 1-butene homopolymer (D) (MFR: 100 g/10 min, $\overline{Mw}/\overline{Mn}=5$, II=97%) were used. Press sheets were prepared from the pellets and measured for heat resistance, tensile yield stress and impact strength. Pipes were prepared from the pellets and evaluated for inside-hot pipe pressure-creep characteristic and for moldability. The results are shown in Table 1.

TABLE 1

| | Resin Weight % | | Nucleating Agent Weight Part | Basic Physical Properties | | Sheet Physical Properties | | | Pipe Physical Property and Moldability | |
|---|---|---|---|---|---|---|---|---|---|---|
| | | | | MFR (g/10 min) | Isotatic Value (%) | Tensile Yield Stress (Kg/cm$^2$) | Izod Impact Strength (kg cm/cm) | Bicut Softening Point (°C.) | Creep Resistance (Hour) | Moldability and Rough Surface |
| | PB - A | PB - B | | | | | | | | |
| Example 1 | 90 | 10 | PE = 0.2 | 0.3 | 95 | 178 | 38 | 118 | 3500 | o |
| Example 2 | 80 | 20 | PE = 0.2 | 0.5 | 95 | 179 | 42 | 118 | 2800 | o |
| Example 3 | 70 | 30 | PE = 0.2 | 0.9 | 95 | 180 | 41 | 118 | 4100 | o |
| Example 4 | 80 | 20 | EBSA = 0.5 | 0.5 | 95 | 188 | 33 | 122 | 5000 more than | o |
| Example 5 | 80 | 20 | — | 0.5 | 95 | 174 | 59 | 115 | 2100 | o |
| | PB -C | PB -D | | | | | | | | |
| Example 6 | 80 | 20 | PE = 0.2 | 0.2 | 97 | 191 | 35 | 123 | 5000 more than | o |
| Example 7 | 70 | 30 | PE = 0.2 | 0.5 | 97 | 193 | 33 | 123 | 5000 more than | o |

Heat Resistance: Heat resistance was measured according to JIS K 7206 (Bicut softening temperature test method for thermoplastic plastics). This Bicut softening temperature is a scale to denote the maximum usable temperature of a resin, and, in case of pipes for hot water is preferably at about 100° C.
Tensile Yield Stress: This was measured according to ASTM D638 using ASTM No. 4 dumbbells.
Impact Strength: This was measured according to ASTM D256 at 0° C. giving a notch.
Inside-hot Pipe Pressure-creep Characteristic: A pipe was immersed in a constant temperature bath adjusted to 90 ± 1° C. Nitrogen (N$_2$) gas was introduced into the pipe and pressurized so that stress generated in the direction of the circumference of the pipe was 70 kg/cm$^2$, and the time until the pipe was broken was measured.
Moldability of Pipes: Pipes were molded at a molding speed of 10 m/min, the inner and outer faces of the resulting pipes were observed with the naked eye and evaluated according to the following criterion.
o ... Moldability was good and the appearance of the pipe was good, too.
Δ ... Pipe molding was somehow possible, but small uneven rough surfaces were formed on the inner and outer faces of the pipe.
x ... Pipe molding was not possible.

COMPARATIVE EXAMPLE 1

A composition was prepared in the same manner as in Example 1 except for using no 1-butene homopolymer (B). Likewise, as in Example 1, sheets were prepared and measured for heat resistance, tensile yield strength and impact strength, and pipes were prepared and evaluated for inside-hot pipe pressure-creep characteristic and for moldability. The results are shown in Table 2.

COMPARATIVE EXAMPLE 2

A composition was prepared in the same manner as in Example 1 except for using no 1-butene homopolymer (A). Likewise, as in Example 1, sheets were prepared and measured for heat resistance, tensile yield strength and impact strength, and pipes were prepared and evaluated for inside-hot pipe pressure-creep characteristic and for moldability. The results are shown in Table 2.

COMPARATIVE EXAMPLE 3

A composition was prepared in the same manner as in Example 1 except that a 1-butene homopolymer (E) (MFR: 0.5 g/10 min, $\overline{Mw}/\overline{Mn}=12$, II=95%) was used in place of the 1-butene homopolymers (A) and (B). Sheets were prepared from the composition in the same manner as in Example 1 and measured for heat resistance, tensile yield stress and impact strength, and pipes were prepared from the composition and evaluated for inside-hot pipe pressure-creep characteristic and for moldability. The results are shown in Table 2.

COMPARATIVE EXAMPLE 4

A composition was prepared in the same manner as in Example 1 except that a 1-butene homopolymer (F) (MFR: 0.5 g/10 min, $\overline{Mw}/\overline{Mn}=4.5$, II=90%, was used in place of the 1-butene homopolymers (A) and (B).

Sheets were prepared from the composition in the same manner as in Example 1 and measured for heat resistance, tensile yield stress and impact strength, and pipes were prepared from the composition and evaluated for inside-hot pipe pressure-creep characteristic and for moldability. The results are shown in Table 2.

TABLE 2

| | Resin | | | | | Sheet Physical Properties | | | Pipe Physical Property and Moldability | |
|---|---|---|---|---|---|---|---|---|---|---|
| | Poly-butane Weight % | Nucleating Agent Weight Part | Basic Physical Properties | | | Tensile Yield Stress (Kg/cm²) | Izod Impact Strength (kg cm/cm) | Bicut Softening Point (°C.) | Creep Resistance (Hour) | Moldability and Rough Surface |
| | | | $\overline{Mw}/\overline{Mn}$ | MFR (g/10 min) | Isotactic Value (%) | | | | | |
| Comparative Example 1 | PB-A = 100 | PE = 0.2 | 4.5 | 0.2 | 95 | 176 | 62 | 116 | 2400 | Δ |
| Comparative Example 2 | PB-B = 100 | PE = 0.2 | 4.5 | 20 | 95 | 183 | 17 | 121 | 4000 | x |
| Comparative Example 3 | PB-E = 100 | PE = 0.2 | 12 | 0.5 | 95 | 173 | 8 | 117 | 2300 | ○ |
| Comparative Example 4 | PB-F = 100 | — | 4.5 | 0.5 | 95 | 133 | no fracture | 95 | 0 | Δ |

*Same test methods as in Table 1 were used.

It is observed from Table 2 (Comp. Ex. I) that when pipe molding was carried out at 10 m/min, visible rough surfaces were formed on the inner and outer surfaces of the resulting pipe. The resulting sheets were poor in impact strength and pipe molding was impossible because the viscosity of the molten parison was extremely small (see, Comp. Ex. 2). The resulting sheets were also low in tensile yield stress and in the inside-hot pipe pressure-creep test of the pipes, the pipes were burst under the stress of 75 kg/cm² (see, Comp. Ex. 4).

While this invention has been described in detail for the purpose of illustration, it is not to be construed as limited thereby but is intended to cover all changes and modifications within the spirit and scope thereof.

What is claimed is:

1. A poly(1-butene) resin composition comprising 60 to 95 parts of a poly(1-butene) resin (A) having a melt flow rate of from 0.01 to 5 g/10 min, a ratio of ($\overline{Mw}/\overline{Mn}$) of weight average molecular weight ($\overline{Mw}$) to number average molecular weight ($\overline{Mn}$), representing molecular weight distribution, of 6 or less and an isotactic value of 93% or more, and 40 to 5 weight parts of a poly(1-butene) resin (B) having a melt flow rate of at least 20 times more than that of poly(1-butene) resin (A), a ratio of ($\overline{Mw}/\overline{Mn}$) of weight average molecular weight ($\overline{Mw}$) to number average molecular weight ($\overline{Mn}$), representing molecular weight distribution, of 6 or less and an isotatic value of 93% or more.

2. A composition as in claim 1 having a higher speed moldability relative to commercial poly(1-butene) resin.

3. A composition as in claim 1 wherein said melt flow rate of (A) is from 0.1 to 2 g/10 min.

4. A composition as in claim 1 wherein said poly(1-butene) resins (A) and (B) have a weight average molecular weight ($\overline{Mw}$) of not more than 5.

5. A composition as in claim 1 wherein said poly(1-butene) resins (A) and (B) have an isotatic value of from 93 to 98%.

6. A composition as in claim 1 wherein said poly(1-butene) resin (B) has a melt flow rate of up to 1000 times more than the melt flow rate of said poly(1-butene) resin (A).

7. A composition as in claim 1 wherein the ratio of (A):(B) is from 90:10 to 70:30.

8. A composition as in claim 1 further comprising a nucleating agent.

9. A composition as in claim 8 wherein said nucleating agent is present in an amount within the range of from 0.01 to 2 wt %.

10. A composition as in claim 8 wherein said nucleating agent is present in an amount within the range of from 0.05 to 0.5 wt %.

11. A composition as in claim 8 wherein said nucleating agent is a member of the group consisting of polyethylene resins, polypropylene resins, polyethylene waxes, and ethylenebisstearoamide.

12. A composition as in claim 1 further comprising an antioxidant(s).

13. A composition as in claim 12 wherein said antioxidant(s) is present in an amount within the range of from about 0.1 to 2 wt parts of (A) and (B).

14. A poly(1-butene) resins composition comprising:
   (a) a poly(1-butene) resin having a melt flow rate of from 0.1 to 2 g/10 min (A); and
   (b) a poly(1-butene) resin (B) having a melt flow rate of greater than 1000 times that of (A) wherein (A) and (B) have an isotactic value of 98% and a ratio of ($\overline{Mw}/\overline{Mn}$) of weight average molecular weight ($\overline{Mw}$) to number average molecular weight ($\overline{Mn}$) of not more than 5, and wherein (A) and (B) are present in a ratio of from 90:10 to 70:30;
   (c) a nucleating agent present in an amount of from 0.05 to 0.5 wt %;
   (d) an antioxidant(s) present in an amount of from 0.5 to 1.8 weight parts of (A) and (B); and
   (e) an olefinic elastomer.

15. A composition as in claim 14 having and exhibiting a higher speed moldability relative to commercial poly(1-butene) resin.

16. A shaped article produced from the composition of claim 1.

* * * * *